(No Model.)
M. B. RYAN.
ADJUSTABLE AND REMOVABLE HANDLE BAR FOR BICYCLES.
No. 551,173. Patented Dec. 10, 1895.
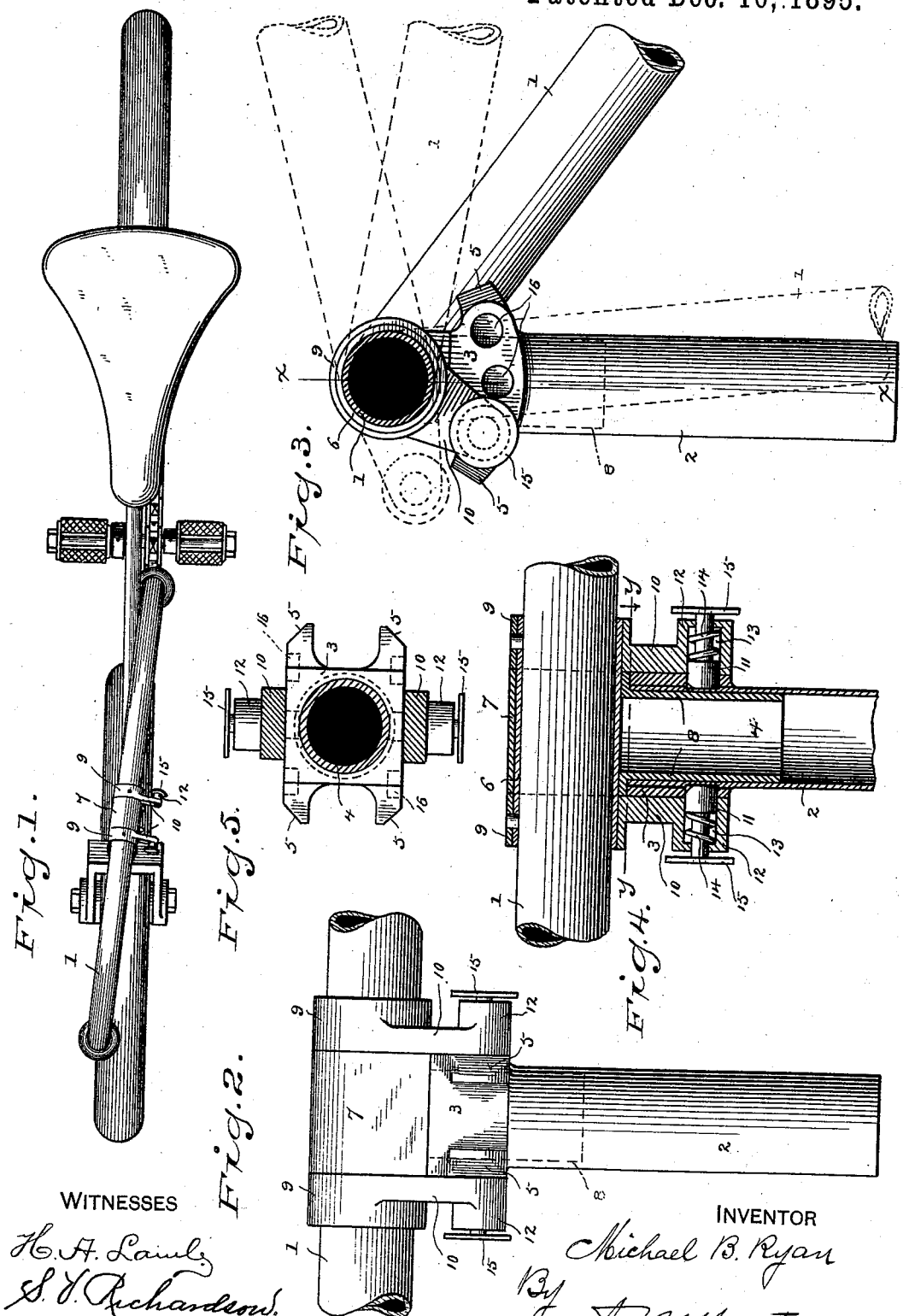
WITNESSES
INVENTOR

UNITED STATES PATENT OFFICE.

MICHAEL B. RYAN, OF BRIDGEPORT, CONNECTICUT.

ADJUSTABLE AND REMOVABLE HANDLE-BAR FOR BICYCLES.

SPECIFICATION forming part of Letters Patent No. 551,173, dated December 10, 1895.

Application filed July 22, 1895. Serial No. 556,718. (No model.)

*To all whom it may concern:*

Be it known that I, MICHAEL B. RYAN, a citizen of the United States, residing at Bridgeport, in the county of Fairfield and State of Connecticut, have invented certain new and useful Improvements in Adjustable and Removable Handle-Bars for Bicycles; and I do hereby declare the following to be a full, clear, and exact description of the invention, such as will enable others skilled in the art to which it appertains to make and use the same.

My invention has for its object to provide a handle-bar for bicycles so constructed and arranged that it may by a simple movement be adjusted in the vertical plane and locked in position after adjustment without the rider being required to dismount, which may be swung in the horizontal plane so as to lie parallel with the front wheel should it be required to lean the bicycle against a wall or to pass through a narrow passage, or which may be readily removed from the bicycle should it be required to leave the latter unguarded, thereby rendering the bicycle useless.

With these ends in view I have devised the novel construction of which the following description, in connection with the accompanying drawings, is a specification, numbers being used to designate the several parts.

Figure 1 is a plan view of a bicycle, showing the position of the handle-bar when it has been given a quarter-turn in the horizontal plane and is lying approximately in the plane of the front wheel; Fig. 2, an elevation, either front or rear, on an enlarged scale, of the handle-bar, steering-rod, and locking device; Fig. 3, a side elevation corresponding therewith, showing in full and dotted lines different adjustments of the handle-bar in the vertical plane and also the disengaged position of the locking device as when the handle-bar is to be swung in the horizontal plane or removed; Fig. 4, a section on the line *x x* in Fig. 3; and Fig. 5 is a section on the line *y y* in Fig. 4, looking down.

1 denotes the handle-bar and 2 the handle-bar post, which is provided with a head 3 and an opening 4 and upon its front and rear faces with bevels 5. The sides of the head are made flat and lie parallel with each other and are each provided with sockets 16, preferably placed opposite to each other.

6 denotes a sleeve, which is brazed or otherwise rigidly secured to the handle-bar.

7 is a sleeve shorter than sleeve 6, within which the latter turns, and 8 is a shank rigidly secured to sleeve 7 and adapted to turn in the handle-bar post, as clearly shown in Fig. 4 in connection with Fig. 1.

9 denotes other sleeves lying outside of sleeve 6 and contiguous to the ends of sleeve 7, said sleeves 9 being rigidly secured to sleeve 6, as by rivets or brazing, or both, as may be preferred.

10 denotes arms extending radially from sleeves 9, which carry a locking device for locking the handle-bar to the head—as, for example, bolts or latches 11. The special construction of these bolts or latches is of course not of the essence of my invention. I have shown the arms as provided with heads 12 having sockets 13 in which the bolts lie, springs 14 being provided to throw the bolts forward, so that they will engage the sockets 16 in the opposite sides of head 3 when the bolts or latches register therewith. The shanks of the bolts extend through the outer ends of heads 12 and are provided with finger-pieces 15 for convenience in manipulation. It will thus be seen that the handle-bar and sleeves 6 and 9 may be turned together and will carry arms 10 and the bolts or latches.

The operation is as follows: Suppose that it is desired to adjust the handle-bar in the vertical plane, the operator retracts the bolts or latches by means of the finger-pieces and turns the handle-bar upward or downward as may be required, locking the handle-bar after adjustment by permitting the bolts or latches to engage the sockets in the head. One side of the head only is shown, and this is shown as provided with three sockets, thus giving three vertical adjustments to the handle-bar, which is ordinarily quite sufficient, but more adjustments may be readily provided for. Should it be desired to swing the handle-bar in the horizontal plane, so that the handle-bar will lie approximately in the plane of the front wheel, the operator simply after disengaging the bolts or latches turns the handle-bar in either direction far enough to carry it past head 3. In this position of the parts the handle-bar and shank may be swung in either direction independently of the handle-bar post. This feature of my novel handle-bar is of great value, as it enables a machine to be passed through a narrow opening or doorway or to be leaned against a wall, in which position it will remain stationary, and will furthermore permit a single machine or a number of machines to be stored in very much less space than has heretofore been required.

While in the position just referred to—that is, the bolts or latches being disengaged—the handle-bar, sleeves and shank may be entirely removed from the machine by simply lifting them up and withdrawing the shank from the handle-bar post. This feature of construction is valuable in many instances, as it enables a machine or a number of machines to be stored in very small compass, or where it is necessary to leave a machine unguarded it enables the rider to remove a portion of the machine essential to its operativeness and carry it with him.

It will be obvious that the handle-bar may be readily replaced by inserting the shank in the opening in the handle-bar post, the handle-bar being turned sufficiently to carry the bolts or latches out of engagement with the head. The handle-bar is then turned in the vertical plane until the bolts or latches engage sockets in head 3. Bevels 5 act to make the bolts or latches self-acting in turning the handle-bar to place—that is to say, the ends of the bolts or latches engage the bevels, are forced inward thereby, and ride up the bevels and upon the sides of the head into position to enter the sockets when brought into alignment therewith. By making the sides of the heads flat and parallel to each other I insure that the handles will be self-adjusting, that is to say, it is made impossible to lock the handle-bar in position except when the flat sides of the head are engaged by arms 10, so that any incorrect position of the handle-bar relatively to the handle-bar post is rendered impossible.

Having thus described my invention, I claim—

1. The combination with a bicycle handle-bar post, of a handle-bar mounted to turn or swing freely thereon in a substantially horizontal plane to adapt it to be turned parallel with the front wheel or to be removed from said post, the said post having flat side portions or faces and the bar being mounted to turn on its axis and having arms extending therefrom to engage the side faces of the post to retain the bar, when in use, in a position parallel with the axle of said wheel.

2. The combination with a bicycle handle bar post having a head provided with bevels 5 and sockets 16, of a handle bar, a sleeve within which the handle bar may turn and which is provided with a shank adapted to turn in the handle bar post and arms extending from the handle bar and carrying spring actuated latches adapted to be retracted by the bevels and to engage the sockets in the head.

3. The combination with a bicycle handle bar post having a head and an opening, of a handle bar, a sleeve 7 within which the handle bar may turn and which is provided with a shank adapted to turn in the opening and to be removed therefrom, sleeves 9 rigidly secured to the handle bar contiguous to the ends of sleeve 7 and a locking device for locking sleeves 9 to the head, the handle bar being capable of movement in the vertical or horizontal plane or of removal when the locking device is disengaged.

In testimony whereof I affix my signature in presence of two witnesses.

MICHAEL B. RYAN.

Witnesses:
A. M. WOOSTER,
S. V. RICHARDSON.